Feb. 1, 1955 L. LEE II 2,700,872
FUEL CONTROL APPARATUS FOR INTERNAL-COMBUSTION ENGINES
Filed Jan. 11, 1947 3 Sheets-Sheet 1

INVENTOR.
LEIGHTON LEE II
BY
Lester W Clark
AGENT

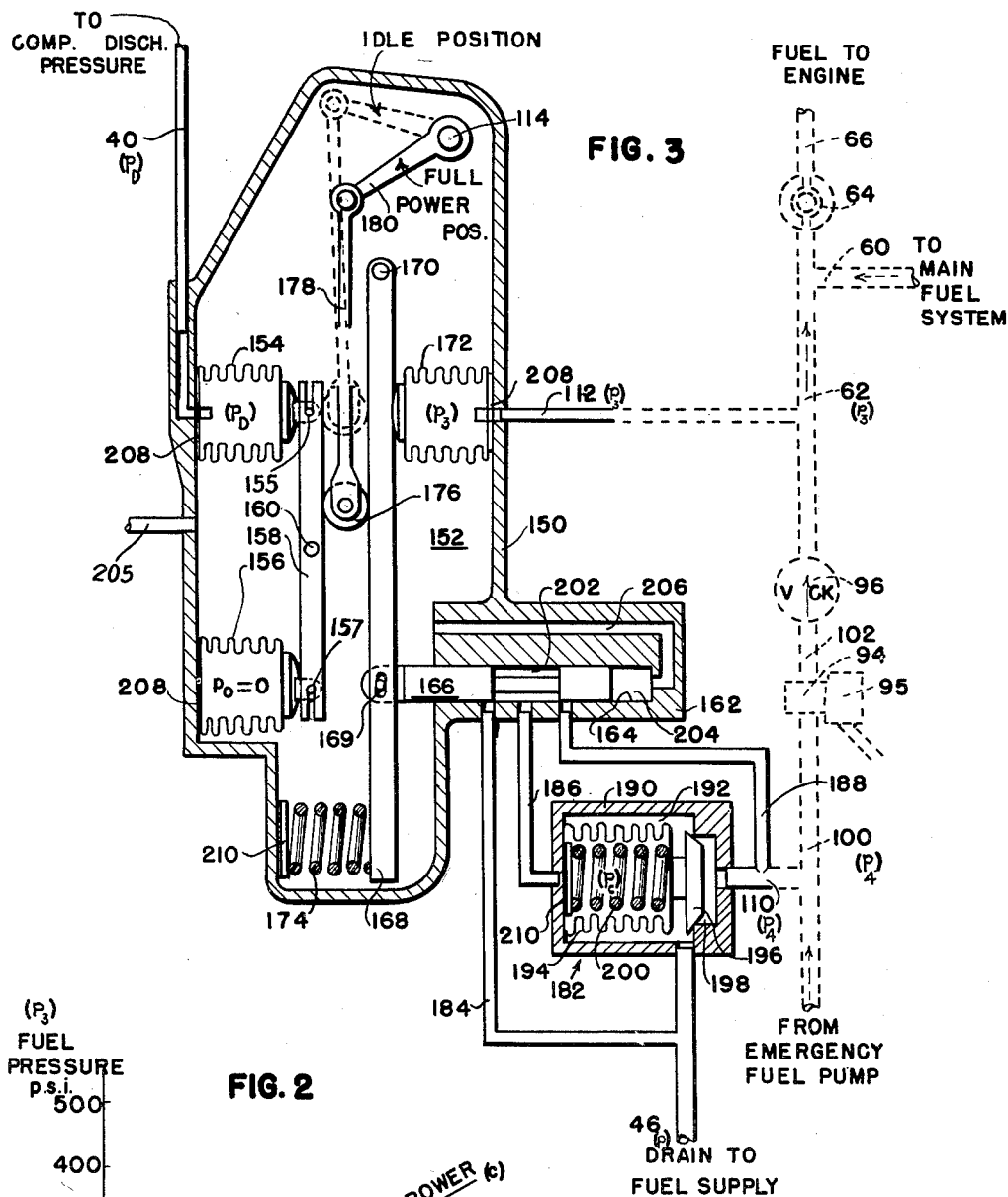

SECTION A-A
OF FIG. 4

INVENTOR.
LEIGHTON LEE II
BY
AGENT

United States Patent Office 2,700,872
Patented Feb. 1, 1955

2,700,872

FUEL CONTROL APPARATUS FOR INTERNAL-COMBUSTION ENGINES

Leighton Lee II, Rocky Hill, Conn., assignor to Niles-Bement-Pond Company, West Hartford, Conn., a corporation of New Jersey Application January 11, 1947, Serial No. 721,651

39 Claims. (Cl. 60—39.28)

The present invention applies to fuel control apparatus for internal combustion engines, inclusive of gas turbine engines, jet engines, and combination gas turbine-and-jet engines; and more particularly to emergency fuel control apparatus for such engines.

The particular embodiment of my invention, as shown and described herein, is intended for emergency control of fuel flow to an engine suitable for propeller propulsion, jet-propulsion, or combined propeller-and-jet propulsion of aircraft. Such an engine generally includes an air inlet, an air compressor, one or more combustion chambers, a gas turbine, and a tail pipe for discharging combustion gases to the atmosphere.

Associated with the engine are related main and emergency fuel supply systems comprising main and emergency fuel pumps and fuel control apparatus, respectively, together with suitable connections between the two fuel systems. The emergency fuel control apparatus is required to semi-automatically control fuel flow to the engine in the event of failure of the main fuel system. At the discretion of the operator, however, the emergency fuel control apparatus may be rendered inoperative or its function modified to suit take off and normal cruise conditions of operation.

Owing to need of avoiding excessive speeds and temperatures in operation of an engine to which my invention particularly applies, as well as to the necessity or desirability of controlling the fuel flow in order to control the engine speed, the main fuel control apparatus may be made to regulate the fuel flow under normal conditions as a function of engine speed and temperature and/or other variables. When a speed responsive main control is employed, the operator may predetermine the engine speed by moving an engine control lever to a position corresponding to a desired value of speed, the control lever being connected to the fuel control apparatus for manual control of the latter. The main fuel control apparatus, in addition to controlling the engine speed, may also control the respective rates of acceleration and deceleration, serve to compensate variations in the condition of flight and/or engine operation which affect the density of air in the air inlet to the engine, and prevent excessive engine temperature and speed.

The emergency control apparatus is desirably of simplified design and construction and it is not expected to entirely relieve the operator of the responsibility of observing engine instruments and of manually adjusting the position of the control lever with somewhat greater diligence than is required in normal engine operation. In the embodiment shown and described herein, however, means are provided to minimize the operator's attention to the various aspects of emergency fuel control.

Objects of my invention are:

1. To provide improved emergency fuel control apparatus for an internal combustion engine which will maintain a predetermined linear relationship between the pressure of fuel and a measure of the combustion air flowing to the engine;

2. To provide in such apparatus improved manually operated means for varying said linear relationship;

3. To provide, in apparatus such as described, means for compensating the effect of altitude changes;

4. To include in such apparatus an hydraulically operated fuel pressure regulating valve and improved means for employing fuel as an hydraulic fluid and for controlling the fluid supplied to said regulating valve.

Other objects and advantages of my invention will become apparent from a consideration of the appended specification, claims, and drawings, in which:

Figure 1 shows, somewhat diagrammatically, an internal combustion engine together with associated main and emergency fuel systems, including a diagrammatic illustration of the apparatus of Figure 3;

Figure 2 graphically illustrates the requirements of the emergency control apparatus in terms of fuel pressure versus absolute compressor discharge pressure;

Figure 3 illustrates, somewhat diagrammatically, emergency fuel control apparatus in accordance with the principles of my invention;

Figure 1:
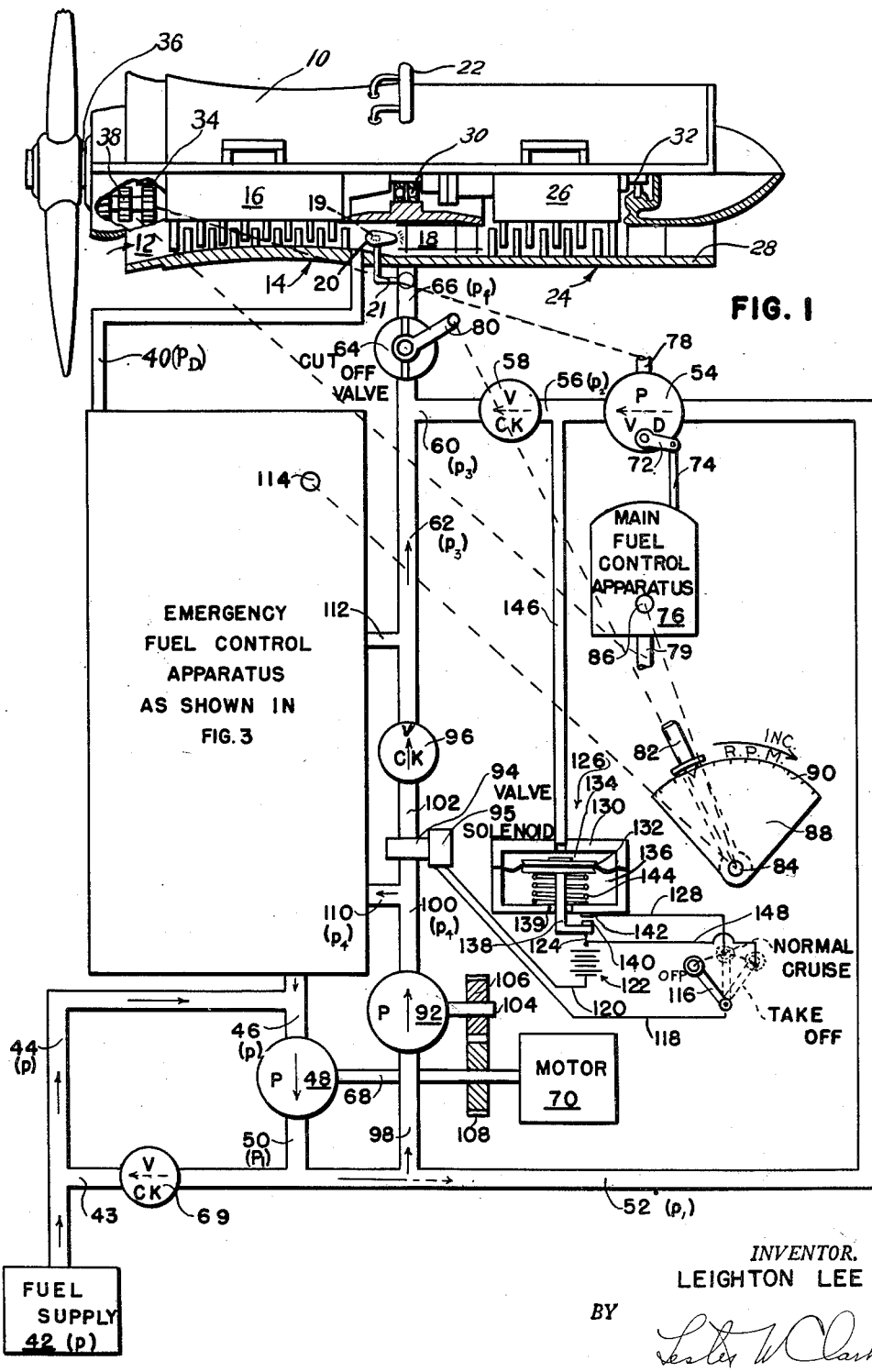

Referring to the drawing, Figure 1, there are shown the principal elements of an internal combustion engine suitable for propeller-propulsion or propeller-and-jet propulsion of aircraft, as follows: a supporting casing 10, an air inlet 12, a multi-stage compressor indicated as 14, a compressor rotor shaft 16, a combustion chamber 18, a number of fuel discharge nozzles one of which is designated 20 connected to a generally circular manifold 22 by means of a conduit 21 for each of the nozzles 20, a multi-stage turbine indicated as 24, a turbine rotor shaft 26 connected to the compressor rotor shaft 16, a tail pipe 28 for discharge of combustion gases from turbine 24, a center bearing 30 and end bearings 32 and 34 supported by casing 10, a propeller shaft 36, and a gear train 38 connecting shaft 36 to shaft 16.

A conduit 40 is provided for transmitting the compressor discharge pressure $p_D$ from the engine to the emergency fuel control apparatus of Figure 3. The compressor discharge pressure $p_D$ is indicative of the rate of air flow thru the engine and is a function of compressor characteristics, the engine speed, flight speed, altitude of flight, and other variables. Pressure $p_D$ increases as the engine speed increases and as the density of air increases in the air inlet 12, whether such density increase is produced by an increase in altitude density or by increase of ram due to increased flight speed.

It is necessary to accelerate the engine of Figure 1 by external means to a starting speed at which self-operation occurs. The speed required for starting depends upon design of the engine, being approximately 3,000 and 8,000 R. P. M., respectively, for two engines currently in use which have maximum speeds of approximately 7,000 and 13,000 R. P. M. The fuel pumps are in operation before the engine starts so that fuel under pressure is being supplied to conduit 62 when the starting speed is attained. Upon starting, the external starting means is disconnected. Sustained self-operation at idling speed is possible after the engine is heated, and in order to avoid "burner blow-out" and consequent stopping of the engine, both the main and emergency fuel apparatus are made to normally provide the minimum fuel flow required for maintaining idling engine speed.

The following elements are included in the main fuel system: a fuel supply 42 at a pressure $p$, connected conduits 44 and 46, a boost pump 48, a boost pump discharge conduit 50, a conduit 52, a main fuel pump 54 responsive to a main fuel control apparatus 76, a main pump discharge conduit 56, a check valve mechanism 58, a conduit 60, another conduit 62, a cut-off valve diagrammatically shown as 64, and a conduit 66 connected to manifold 22 of the engine. Flow in the main fuel system occurs from supply 42 in the direction corresponding to the stated order of arrangement. Nozzles 20 contain a number of fixed slots 19 thru which fuel flows from conduits 21 to cause a swirling spray into the combustion chambers 18. Slots 19 are subject to the differential between the respective pressures in conduits 66 and the pressure inside nozzles 20 which is a function of the combustion chamber pressure. Fuel flow to the engine is therefore a function of the pressure in conduit 66, the regulation of which is the function of the main or emergency fuel control apparatus. In some installations, flow from conduit 66 is conducted by two parallel branch conduits to two separate manifolds connected to separate series of slots in each nozzle. In this case, one of the manifolds is supplied with fuel only when the pressure in conduit 66 reaches a predetermined value. The reason for provision of dual manifolds is apparent when it is considered that the fuel flow thru a single series of fixed slots varies as a function of the square root of the pressure differential controlling flow. Provision of dual manifolds, as described, eliminates the possibility of prohibitively high pressures in conduit 66 otherwise encountered in some installations.

Boost pump 48 is operated by a shaft 68 driven by a motor 70 and may be of the centrifugal or any other type suitable for supplying fuel to conduits 50 and 52.

A check valve mechanism 69 is provided between conduit 52 and another conduit 43 for by-passing fuel from the outlet of the boost pump 48 to conduit 44 and to maintain a substantially constant pressure $p_1$ in conduits 50 and 52.

The main fuel pump 54, in the arrangement shown, has delivery varying means therein which is operated by a lever 72 in response to movement of a rod 74 connected to and controlled by main fuel control apparatus 76. Pump 54 is operated by a shaft 78 driven by the engine, as shown, or by other suitable means, and supplies fuel at a pressure $p_2$ to conduit 56.

Check valve mechanism 58 is employed so that no flow may occur from conduit 60 to the main pump discharge conduit 56.

The cut-off valve 64 may be of any one of several kinds, including a piston-type stop cock. It is controlled by a lever 80 from wide open to closed positions as subsequently explained.

The main fuel control apparatus 76 may be of the type disclosed in my copending application, Serial No. 725,842, filed February 1, 1947, now Patent No. 2,669,094, issued February 16, 1954, in which case the apparatus is operated by a shaft 79 driven by the engine at a speed proportional to engine speed, and is thereby rendered responsive to the engine speed. The main fuel control apparatus disclosed in the Lee patent cited is also responsive to the compressor pressure differential in the engine, and to the engine temperature, and is subject to manual control by means of an engine control lever 82 fixed to a shaft 84 which is connected to a shaft 86 in main fuel control apparatus 76. Cut-off valve 64 also is responsive to control lever 82 which is operable in respect to a quadrant 88 having a scale 90 thereon calibrated in R. P. M. units of engine speed. In normal operation of the particular arrangement shown in Figure 1, when control lever 82 is in its extreme leftward position, cut-off valve 64 is closed so that no fuel may flow to the engine. While the engine cannot operate with the control lever in this extreme shut-off position, as lever 82 approaches this position the corresponding position of shaft 86 causes the main control apparatus 76 to operate rod 74 so that the fuel deliverable by the main fuel pump 54 approaches a minimum value, and hence the engine speed corresponding to the lever position approaches a minimum value. As the control lever is advanced in a clockwise direction, in the arrangement of Figure 1, cut-off valve 64 opens, becoming wide open at twenty-degree throttle position.

In normal operation of the main fuel system, within an initial portion of the first twenty-degree movement of control lever 82, cut-off valve 64 controls the pressure $p_F$ in conduit 66 at a value somewhat less than that of the pressure $p_3$ in conduits 60 and 62, by restricting flow thru the valve. During the remaining portion of the first twenty-degree lever movement, however, the cut-off valve is sufficiently open so that it does not restrict the relatively low fuel flow provided by the fuel control apparatus in this range. As the control lever is further advanced thrucut its range of movement, the delivery of pump 54 and pressure $p_3$ increase; and when cut-off valve 64 ceases to restrict the flow, the fuel flow varies as a function of the pressure $p_F$ in conduit 66 which then equals pressure $p_3$ and has a maximum value when lever 82 is in its extreme clockwise position. As the control lever is advanced, and as the fuel flow to the engine is increased, the engine speed increases. Main fuel control apparatus 76 may be provided with a speed governor mechanism which reduces the fuel flow when the engine speed exceeds a value corresponding to the position of lever 82, to maintain a desired speed. It may also be provided with temperature responsive means, as is the apparatus disclosed by the Lee Patent No. 2,669,094, to control the fuel flow to avoid engine temperature exceeding a preselected limiting value.

Cut-off valve 64 is used principally for stopping the engine and for regulating fuel flow in the idling range. The fuel control apparatus regulates the pressure $p_3$ of fuel supplied to the cut-off valve mechanism 64, and hence co-operates with mechanism 64 to regulate the fuel pressure $p_F$ in conduit 66 and the fuel flow to the engine.

The emergency fuel control apparatus is desired to serve the principal pressure regulating function of the main control apparatus, when the latter fails due to any cause which prohibits proper regulation of the pressure in conduits 60 and 66 by the main fuel pump and main fuel control apparatus.

Principal elements of the emergency fuel system include an emergency fuel pump 92, a valve 94 operated by a solenoid 95, a check valve mechanism 96, and the emergency fuel control apparatus of Figure 3. When the main fuel system fails, the emergency fuel system delivers fuel from conduit 52, thru a conduit 98, emergency fuel pump 92, a conduit 100, solenoid operated valve 94, a conduit 102, and check valve mechanism 96, to conduit 62 and thence past cut-off valve 64 and thru conduit 66 to the engine.

In the particular application shown in Figure 1, the emergency fuel pump 92 is operated by a shaft 104 driven thru a pair of gears 106 and 108 by shaft 68 and motor 70. Both the emergency pump 92 and the boost pump 48 therefore operate simultaneously whence it follows that emergency pump 92 is in operation whenever the engine is operating; when the emergency system is not supplying fuel to the engine all fuel discharged by pump 92 is by-passed from the pump thru conduits 100, a conduit 110 and the emergency fuel control apparatus, into conduit 46. The emergency pump thus maintains a constant circulation of fuel under no load and is adapted to take over the load of the main pump as subsequently explained.

The emergency fuel control apparatus has another conduit 112 connecting it to conduit 62 for transmitting the pressure in conduit 62 to the emergency control apparatus. Also, shaft 84 is connected to a shaft 114 in the emergency control apparatus so that the latter is responsive to movement of control lever 82.

Supplementing the engine control lever 82, there is a manually operated 3-position switch 116 for control of the solenoid operated valve 94.

In the "Off" position of switch 116, the solenoid 95 is not energized and valve 94 is closed, thereby inactivating the emergency fuel control apparatus except as means for by-passing the flow from emergency pump 92 thru the apparatus from conduit 110 to conduit 46.

In the "Normal cruise" position of switch 116, a solenoid circuit is establishable, as follows: from the upper terminal of a battery 122, thru a conductor 124, a pressure responsive switch 126, a conductor 128, switch 116, a conductor 118, solenoid 95, and a conductor 120 to the lower terminal of battery 122. Pressure responsive switch 126 includes a body 130 having therein a diaphragm assembly 132 separating a pair of chambers 134 and 136 and supporting a rod 138 movable thru an aperture 139 in the lower end of body 130, a contact 140 fixed to the lower end of rod 138, another contact 142 fixed to body 130 opposite contact 140, and a spring 144 biasing diaphragm assembly 132 upwardly. A conduit 146 connects conduit 56 to chamber 134 of pressure switch 126, chamber 136 being vented to the atmosphere thru aperture 139. When the pressure $p_2$ in chamber 134 falls below a value determined by spring 144, which value approximates 20 p. s. i. in the embodiment shown, indicating complete failure of the main pump and/or main fuel control apparatus, diaphragm assembly 132 and rod 138 move upward and contacts 140 and 142 are connected, thereby establishing the circuit and energizing solenoid 95 so that valve 94 opens. Flow then occurs thru the emergency system from pump 92 to conduit 62, check valve mechanism 58 closes and check valve mechanism 96 opens.

In the "Take off" position of switch 116, a circuit including conductor 148 is established, so that solenoid 95 is energized and valve 94 is open regardless of pressure switch 126. The pressure differential across check valve mechanism 96 then determines whether or not fuel flows thru the emergency system to the engine.

The foregoing description of the arrangement of Figure 1 is subsequently supplemented with more complete details of its operation.

The control apparatus hereinafter described is not limited to use in a fuel system as shown and described in connection with Figure 1 but is equally suited to use in other systems including modified forms of the system of Figure 1.

*Figure 2*

The relationship between fuel pressure $p_3$ and the absolute compressor discharge pressure, as shown in Figure 2, is relatively simple and has been established by analytical and empirical means to afford a desired basis for emergency fuel control. Accordingly, the emergency fuel control apparatus of Figure 3 is rendered responsive to the absolute compressor discharge pressure for emergency regulation of the pressure $p_3$ in conduit 62, Figure 1. It is subsequently shown that the relationship between the respective pressures $p_D$ and $p_3$ is varied in response to movement of control lever 82, Figure 1, between extremes indicated by the "Idling" and "Full power" curves of Figure 2. The fuel flow corresponding to the pressure $p_3$ shown in Figure 2 is slightly less than that supplied to the engine by the main fuel system in steady state operation at corresponding values of the compressor discharge pressure. As subsequently explained, this provision is made to avoid rendering the main fuel control partially inoperative in consequence of being overriden by the emergency control to an undesirable extent.

*Figure 3*

Referring to Figure 3 of the drawing, there is shown emergency fuel control apparatus in accordance with the principles of my invention, comprising principal elements as follows: a housing 150 and a chamber 152 therein, a pair of bellows 154 and 156 mounted parallel at the left side of chamber 152, a lever 158 pivoted on a pin 160 in body 150 for engaging the respective right-hand ends of bellows 154 and 156 and for transmitting the motion of each of the bellows to the other in an equal but opposite sense, a valve body 162 integral with housing 150 and on the right-hand side thereof, a bore 164 in valve body 162 having as its centerline the centerline of bellows 156, a valve 166 slidably operable in bore 164, a lever 168 having a pin-and-slot connection 169 with the left end of valve 166, a pivot pin 170 in body 150 to which the upper end of lever 168 is connected, a bellows 172 opposite bellows 154 having its right-hand end fixed to body 150 and its left-hand end contacting lever 168, a spring 174 compressed between body 150 and the lower end of lever 168 and acting thereon in opposition to bellows 172, a circular bearing 176 separating levers 158 and 168 and movable therebetween from a first position on the centerline of bellows 154 and 172 to a second position at a distance downward from the first position somewhat less than the distance from the centerline of bellows 154 to pin 160, a rod 178 having its lower end pivotally connected to bearing 176, a lever 180 mounted on shaft 114 having its end connected to rod 178 so that the position of bearing 176 is variable in response to movement of shaft 114, and a fuel pressure regulator indicated as 182 controlled by valve 166.

The interior of bellows 172 is connected to conduit 112 and is therefore subject to the pressure $p_3$ in conduit 62.

Bellows 154 and 156 are substantially identical and have similar pivotal connections 155 and 157, respectively, with lever 158 so that the latter is operable in response to both expansion and contraction of the bellows. In the particular embodiment shown, the interior of bellows 154 is connected to conduit 40 and is therefore subject to the compressor discharge pressure $p_D$, and bellows 156 is substantially evacuated to a pressure $p_0$ the value of which is substantially zero. Bellows 154 and 156 are therefore subject to the absolute compressor discharge pressure expressible in the form of the differential $(p_D - p_0)$, or as $(p_D)$Abs. If desired, bellows 154 and 156 may be made responsive to the compressor rise, to the absolute compressor inlet pressure, or to any other suitable and available differential or absolute pressure. It is especially desirable, when the main fuel control apparatus 76, Figure 1, is responsive to atmospheric or other air pressures, to operate the emergency control apparatus as a function of the same pressures in order to obtain similar characteristics such as are indicated in Figure 2. Bellows 172 is shown to be substantially the same as bellows 154 and 156, but may be of different size if desired, depending upon performance requirements of the apparatus. Chamber 152 is vented to atmosphere by a tube 205 thereby subjecting the exterior of bellows 154, 156, and 172 to a common pressure.

Valve 166 is undercut to provide the annular chamber 202 inside bore 164 between the upper ends of conduits 184 and 188. When valve 166 is in the neutral position shown, continuous flow thru conduit 188, chamber 202, and conduit 184 is prevented except for such leak as may occur past valve 166. An expansible chamber 204 between respective right-hand ends of valve 166 and bore 164 is connected to chamber 152 by a channel 206 in valve body 162, so that pressures acting directly on valve 166 are fully balanced. Valve 166 has a neutral position at which the upper ends of conduits 188 and 184 are simultaneously just closed by the valve. In this neutral position, fuel is trapped in conduit 186, annular chamber 202, and bellows 194 at a control pressure $p_c$ which may be varied by movement of valve 166.

Fuel by-passing emergency pump 92 thru regulator 182 flows from conduit 110 into chamber 198, past valve 196 to chamber 192 and thence to conduit 46. The effective area of valve 196 is substantially the same as that of bellows 194 so that the position of valve 196 is determined by the differential between the pressure $p_c$ acting on bellows 194 and the pressure $p_4$ acting on valve 196, and by the force of spring 200.

Equilibrium exists when:

$$(p_4 - p_c)A = S$$

in which A is the effective area of the bellows 194 and valve 196 and S is the force of spring 194, the value of S being considered substantially constant. Thus, $$p_4 = p_c + \frac{S}{A}$$

or the value of the pressure in conduits 110 and 100, and hence the value of the pressure at the outlet from emergency fuel pump 92 equals the sum of the values of control pressure $p_c$ and a constant $$\frac{S}{A}$$

As the control pressure $p_c$ increases, the pressure $p_4$ also increases. Use of spring 200 renders it possible to use values of control pressure $p_c$ which are relatively low compared with values of the outlet pressure $p_4$ and to therefore avoid subjecting bellows 194 to an excessive pressure differential.

When valve 166 is moved toward the right from its neutral position, the upper end of conduit 184 remains closed but the upper end of conduit 188 is opened to permit flow from conduit 110 thru conduit 188, chamber 202, and conduit 186, to the interior of bellows 194, thereby increasing the control pressure $p_c$ and moving valve 196 toward seat 198 so that the pressure $p_4$ in conduit 110 is increased. Similarly, when valve 166 is moved leftward from its neutral position, the upper end of conduit 188 remains closed but the upper end of conduit 184 is opened to permit flow from the interior of bellows 194 and thru conduit 186, chamber 202 and conduit 184, to conduit 46 at pressure $p$. In this manner, the value of control pressure $p_c$ is decreased so that a corresponding decrease occurs in the value of the pressure $p_4$ in conduits 110 and 100. Control of valve 166 and hence control of the value of pressure $p_4$ is accomplished as explained in the following.

The apparatus is adjusted by shims 208, or equivalent means at bellows 154, 156, and 172, so that when spring 174 is removed and the pressures inside bellows 154, 156, and 172 are identical, lever 158 is approximately vertical and parallel with lever 168, with circular bearing 176 in the "Idle" position shown in dotted lines in the drawing and valve 166 is in the neutral position shown. The subsequent effect of evacuating bellows 156 and applying atmospheric pressure inside bellows 154 and 172, which condition applies when the engine is at rest, does not disturb the adjustment of the apparatus or positions of levers 158 and 168, when bellows 154 and 172 have the same effective areas, as in the embodiment of Figure 3. This is due to the fact that equal and opposite forces are produced inside bellows 154 and 172 proportional to their respective areas and to the value of the atmospheric pressure.

When spring 174 is installed, however, the adjustment above described is disturbed and in order to restore the parallelism of levers 158 and 168 and to maintain valve 166 in its neutral position it is necessary to increase the value of pressure $p_3$ in bellows 172 to a value which compensates the load on spring 174. Without spring 174, pressure $p_4$ is zero when the differential $(d_D-p_0)$ is 0; with spring 174, however, when the differential $(p_D-p_0)=0$, pressure $p_4$ has a value greater than zero depending upon the load on spring 174 when valve 166 is in its neutral position. The rate of change of pressure $p_4$ above the initial value of $p_4$ determined by spring 174 in respect to the compressor discharge pressure $p_D$ depends upon the respective moment arms of the forces acting on levers 158 and 168. In maintaining valve 166 in its neutral position, therefore, a predetermined relationship between the pressures $p_D$ and $p_3$ is maintained.

Assuming that the main fuel system is inoperative, that check valve mechanism 58 is closed, and that check valve mechanism 96, solenoid operated valve 95, and cut-off valve 64 are wide open, the emergency fuel system supplies fuel to the engine as follows: with circular bearing 176 in the "Idle" position, the loads on springs 174 and 200 are adjusted so that pressure $p_3$ in conduits 62 and 66 has a value indicated at $a$ in Figure 2, when the pressure $p_D$ in bellows 154 is zero; i. e., when bellows 154 is evacuated. If pressure $p_3$ falls below the setting value or the value required to maintain valve 166 in its neutral position, valve 166 moves toward the right to allow fuel to flow thru conduit 188, chamber 202, and conduit 186 into bellows 194 which moves toward seat 198 to increase the value of pressure $p_4$ which, with valve 94 and valve mechanism 96 open, is greater than the corresponding value of pressure $p_3$ by the amount of pressure loss occurring at valve 94 and mechanism 96. If pressure $p_3$ exceeds the desired value, valve 166 moves leftward to close the path of flow thru conduit 188 and to permit flow from bellows 194, thru conduit 186 and chamber 202, into conduit 184 at the relatively lower pressure $p$. In this manner the pressure $p_3$ is maintained substantially constant and, in consequence, valve 166 remains in its neutral position substantially constant, in steady state operation. As the value of the compressor discharge pressure increases, the pressure $p_3$ correspondingly increases at a corresponding rate to a value indicated as $b$ in Figure 2.

When lever 180 is rotated counterclockwise so that circular bearing 176 moves downward to the "Full power" position shown in full lines in the drawing, the value of the pressure $p_3$ corresponding to zero value of the pressure $p_3$ remains the same as in the "Idle position" of bearing 176, but the rate of increase of pressure $p_3$ corresponding to increase of pressure $p_D$ changes owing to change in moment arms of the forces of the bellows 154, 156, and 172. As shown in Figure 2, in the "Full power" position of lever 180, the pressure $p_3$ varies along a line from $a$ to $c$. The point of intersection $a$ of the two lines may be shifted to the right or left of the "O" $p_D$ ordinate by slight adjustment variations in assembly of the control apparatus.

With the emergency control apparatus in operation, at a given position of lever 180 and at any given value of absolute compressor discharge pressure $p_D$, pressure $p_3$ is substantially constant. The effect of reducing the atmospheric pressure by increasing the altitude causes a reduction of the value of the absolute pressure $p_D$ and consequent reduction of the value of pressure $p_3$. When the altitude of flight increases from a value corresponding to a point X on line $ab$, Figure 2, or X' on line $ac$, to another greater value, the resulting fuel pressures $p_3$ change to Y and Y', respectively. A family of lines of infinite number is indicated in dotted lines in Figure 2 corresponding to various positions of lever 180 between extreme "Idle" and "Full power" positions.

The pressure $p_3$ as regulated by the emergency control apparatus of Figure 3 is made to be somewhat less in respect to pressure $p_D$ than is normally provided by the main fuel control apparatus. Thus, when the main control is functioning, bellows 172 causes lever 168 to be moved clockwise so that valve 166 moves leftward to drain bellows 194, valve 196 then remaining substantially wide open. The pressure $p_4$, in this condition of the apparatus, is the same as pressure $p$ in conduit 46 except for the load S of spring 194 which determines the value of the differential $(p_4-p)$. The engine speed and power output are slightly less when fuel is being supplied by the emergency system than when it is being supplied by the main control system, owing to the relatively smaller amount of fuel supplied by the emergency control apparatus.

Check valve mechanism 96 is provided so that no fuel may flow from the main system to conduit 100 and thence to drain conduit 46 thru the emergency control apparatus. When mechanism 96 and valve 94 are open, the drop across mechanism 96 and valve 94 is small and hence the differential between pressures $p_4$ and $p_3$ is relatively small. This differential may be varied as desired, however, since it merely imposes a somewhat greater load on the emergency pump and does not affect the regulation of pressure $p_3$ in conduit 62.

Again referring to Figure 1, when switch 116 is in the "Off" position, solenoid valve 94 is closed and fuel flow to the engine depends upon the pump 54 and the main fuel control apparatus 76, while the emergency control continues to by-pass fuel past valve 196. Failure of the main system, with switch 116 in the "Off" position, results in impaired engine operation or engine failure.

With switch 116 in the normal cruise position, when the pressure $p_2$ in conduit 56 decreases to the predetermined value indicating failure of the main system, solenoid 95 is energized and valve 94 opens. The value of pressure $p_2$ at such failure is appreciably lower than the pressure $p_4$ in conduit 100 so that check valve mechanism 96 opens, check valve mechanism 58 closes, and fuel is supplied to the engine by the emergency system. Under the conditions of normal cruise in which the emergency control does not become effective until the main system fails, the temporarily impaired engine performance which precedes cutting in of the emergency control does not seriously handicap the operator. If such failure occurs during take-off or other critical condition of flight, even momentarily deficient fuel flow may cause serious trouble or even loss of the aircraft.

To eliminate the hazard of main fuel system failure, particularly at take-off, switch 116 is moved to the "Take-off" position, thereby rendering the pressure switch 126 inoperative and opening solenoid operated valve 94. In this condition, whenever the main fuel system fails and the value of pressure $p_3$ decreases, the following sequence of events takes place.

At the start of failure, valve 94 is open and remains so owing to the "Take-off" position of switch 116. Check valve mechanism 96 is closed, however, and pressure $p_4$ in conduits 100, 110, and 102 has a value depending upon pressure $p$ and the spring load S. As pressure $p_3$ decreases so as to fall below the value normally maintained by the main system and to approach the "emergency" value corresponding to the value of the absolute compressor discharge pressure $p_D$, valve 166 moves toward the right and approaches its neutral position. At the instant pressure $p_3$ decreases to the value corresponding to pressure $p_D$ acting on bellows 154, valve 166 is in its neutral position and any further decrease in value of pressure $p_3$ causes further movement of valve 166 toward the right and consequent increase of pressure $p_4$ to the value required to produce the desired "emergency" value of pressure $p_3$ in conduit 62. When failure of the main system occurs rapidly, the response of the emergency control apparatus is about equally rapid so that during take-off there is no fuel flow interruption owing to main fuel system failure. During take-off, therefore, the minimum amount of fuel supplied to the engine satisfies emergency requirements and transition from main control regulation of fuel flow to regulation by the emergency control apparatus is accomplished without interruption.

There is normally a condition in which the engine speed may slightly vary from a desired value. When the main control apparatus is functioning, the slight change in fuel flow and hence in the value of pressure $p_3$ corresponding to the normal speed variation is not sufficient to cause the emergency apparatus to cut-in, the differential between normal main and emergency values of pressure $p_3$ being greater than the normal variations in the value of $p_3$ when the main system is properly functioning. Where this differential not provided, then the main and emergency systems could not be employed simultaneously, as in "Take-off" position of switch 116, since the emergency control would prevent normal safety operation of the main control and overspeeding and/or overheating might result.

Figure 4:
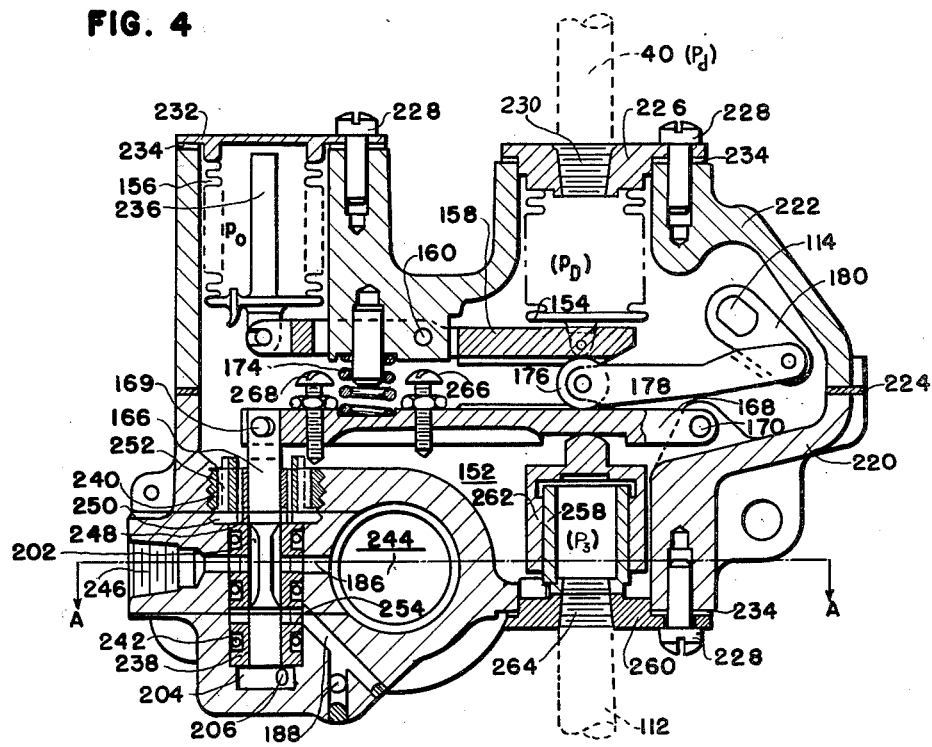
Figure 4 is a cross-sectional view of the emergency fuel control apparatus of Figure 3 substantially as built.
Figure 5:
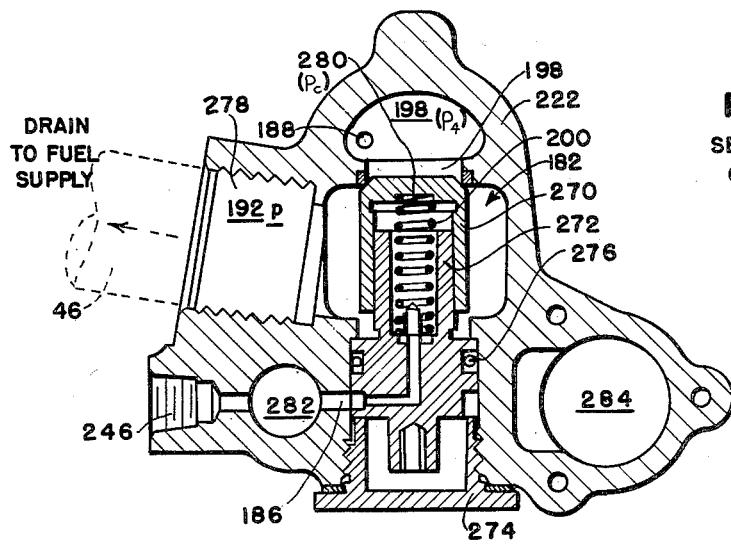
Figure 5 is another cross-sectional view of the apparatus of Figure 4, showing the fuel pressure regulating valve.

*Figures 4 and 5*

Referring to the drawing, Figures 4 and 5, there are shown cross-sectional views of the apparatus of Figure 3 substantially as built. Those elements of Figures 4 and 5 which exactly correspond to their counterparts in Figure 3 have been given the same reference numerals and will not be individually described in connection with Figures 4 and 5.

In Figure 4, a housing 220 and a housing cover 222 serve the purpose of housing 150 of Figure 3. A gasket 224 is held in compression between the housing and cover by screws not shown. Another arrangement is functionally the same as that of Figure 4 but employs a one-piece casting instead of the separate housing and cover castings of Figure 4.

The upper end of bellows 154 is fixed to a flange 226 which is supported by housing cover 222 and is fastened in place by a number of screws one of which is shown as 228. A threaded aperture 230 is provided in flange 226 so that a suitable connection may be made with conduit 40 shown in dotted lines for supplying air to the interior of bellows 154 at the compressor discharge pressure $p_D$.

Similarly, the upper end of bellows 156 is fixed to another flange 232 fastened to housing cover 222 by a number of screws 228.

The lower end of bellows 156 is hinged to the left end of lever 158 which is pivotally mounted on centrally located pin 160. A stop 236 is provided inside bellows 156 to limit contraction of the bellows and corresponding clockwise movement of lever 158. The lower end of bellows 154 is pivotally engaged with the right-hand end of lever 158.

Lever 158 is separated from lever 168 by circular bearing 176 which is pivotally connected to the left end of rod 178. Rod 178 is operated by lever 180 fixed to shaft 114 the angular position of which is manually controlled by lever 82 of Figure 1.

A valve guide 238 is retained in a bored recess 282 (shown in Figure 5) by means of a threaded retainer 240. Guide 238 is provided with three annular seals 242 between the guide and recess 282. Valve 166 operates in guide 238 and, below the lower ends of the valve and guide, there is the chamber 204 connected to chamber 152 by channel 206, only a section of which is shown in Figure 4. The ends of valve 166 are thus subject to identical pressures. Valve 166 is undercut to provide annular chamber 202 which is connected by conduit 186 in housing 222 and guide 238 to a bore 244 and a threaded opening 246 in housing 222.

A port 248 is provided in guide 238 corresponding to the upper end of conduit 184 in Figure 3. Port 238 is connected to a chamber 250 below retainer 240 and thru a pair of passages 252 in the retainer to chamber 152. Similarly, a port 254, corresponding to the upper end of conduit 188 in Figure 3, is connected thru an annular recess in guide 238 to conduit 188 as in Figure 3.

The upper end of valve 166 has the pin and slot connection 169 with the left end of lever 168 which is pivoted at its right-hand end on pin 170.

Instead of the bellows 172 of Figure 3, the apparatus of Figure 4 has a piston assembly which includes a stationary piston 258 fixed to a flange 260 fastened to housing 222 by a number of screws 228. Between each of the flanges 226, 232, and 260 and body 222, there is a gasket 234. A piston sleeve 262 is operable on piston 258 and has its upper end engaged with lever 168 at a point on the centerline common to bellows 154 and piston 258. Flange 260 is provided with a tapped opening 264 for subjecting the interior of piston 258 and sleeve 262 to the fuel pressure $p_3$ transmitted by conduit 112 as in Figure 3.

Spring 174 is compressed between lever 168 and the interior of housing 222 at a point between valve 166 and piston sleeve 262. Upward movement of lever 168 is limited by an adjustable stop 266 and downward movement of lever 168 is similarly limited by means of an adjustable stop 268.

As in the apparatus of Figure 3, lever 168 is subject to an upward force due to pressure $p_3$ acting on piston 258 in opposition to atmospheric pressure $p_A$ in chamber 152, a downward force due to spring 174, and a downward force transmitted thru circular bearing 176 from lever 158 which is subject to a downward force proportional to the absolute compressor discharge pressure $(p_D - p_0) = (p_D)$Abs. acting on the centerline of bellows 154.

Referring to Figure 5, there is shown another sectional view of housing 222 which is the section A—A indicated in Figure 4 and in which the fuel pressure regulator 182 is assembled. In the apparatus of Figure 5, a piston sleeve 270 is slidable on a fixed piston 272 retained in bore 244 (Figure 4) in housing 222 by means of a retainer 274 and is sealed by means of a seal 276. Piston sleeve 270 performs the function of the valve 196 of Figure 3 and piston 272 and piston sleeve 270 co-operate to perform the function of bellows 194. Fuel is supplied by the emergency pump from an inlet (not shown) to chamber 198 from which it flows past seat 198 and piston sleeve 270 into chamber 192 and thence thru a threaded opening and drain conduit 46 to the fuel supply at pressure $p$. The pressure $p_4$ in chamber 198 and hence the pressure at the outlet of the emergency pump is regulated by piston sleeve 270 which is forced toward seat 198 by spring 200 and by the control pressure $p_c$ acting in a chamber 280 between the upper ends of piston 272 and sleeve 270. The control pressure $p_c$ is supplied to chamber 280 thru conduit 186 which crosses the bored recess 282 in which the valve guide 238 of Figure 4 is installed. The threaded opening 246 is used as a test connection and is ordinarily plugged when the apparatus is in use on an engine.

The bore 284 shown in Figure 5 is provided to accommodate the piston 258 and piston sleeve 262 of Figure 4.

Again referring to Figure 4, conduit 188 is supplied with fuel at pressure $p_4$ from chamber 198, Figure 5, in which appears one end of conduit 188.

Use of pistons 258 and 272 and the corresponding sleeves of Figures 4 and 5 instead of bellows 172 and 194, Figure 3, renders the apparatus of Figures 4 and 5 relatively free from failure such as may occur by bellows rupture. Operation of the apparatus of Figures 4 and 5 is the same as explained in connection with Figure 3.

The terms and expressions herein are employed for purposes of description and not of limitation, and I have no intention, in the use of such terms and expressions, of excluding any equivalents of the features shown and described or portions thereof, but recognize that various modifications are possible within the scope of the invention claimed.

I claim as my invention:

1. Fuel control apparatus for an internal combustion engine having associated therewith a source of fuel, a fuel conduit for the flow of fuel from said source to said engine, and a pump in said fuel conduit for producing said flow as a function of the pressure in a portion of said conduit, comprising: first means for obtaining a first measure of said pressure, second means for obtaining a second measure of an operating condition within said engine, and third means responsive to said first and second means for maintaining said pressure in said portion of said fuel conduit in substantially constant linear relationship with said second measure.

2. Control apparatus as set forth in claim 1, including manually operated means for varying said linear relationship.

3. Control apparatus as set forth in claim 1, wherein said condition is an air pressure in said engine, said second means is also responsive to said pressure in said conduit portion and being effective to by-pass fuel from the outlet of said pump to said source, and including manually operated means for varying said linear relationship.

4. Fuel control apparatus for an internal combustion engine having associated therewith a source of fuel, a fuel conduit for the flow of fuel from said source to said engine, and a pump in said fuel conduit for producing said flow as a function of the pressure in a portion of said conduit comprising: first means for obtaining a first force measure of an operating condition in said engine; second means for obtaining a second force proportional to said pressure in said portion of said fuel conduit, a lever and fixed fulcrum corresponding thereto; third means for applying said first and second forces to said lever at predetermined distances from said fulcrum for moving said lever; and fourth means responsive to said lever movement for maintaining said pressure in said conduit portion in linear relationship with said first force so that said linear relationship is a function of the ratio of said distances.

5. Fuel control apparatus for an internal combustion engine having associated therewith a source of fuel, a fuel conduit for the flow of fuel from said source to said engine, a pump in said fuel conduit for producing said flow as a function of the pressure in a portion of said conduit, and a manually operated control lever comprising: first means for obtaining a measure of an operating condition of said engine, second means responsive to said first means for maintaining said pressure in said portion of said fuel conduit in linear relationship with said measure, and means operated by said lever for varying said linear relationship.

6. Fuel control apparatus for an internal combustion engine having associated therewith a source of fuel, a fuel conduit for the flow of fuel from said source to said engine, and a pump in said fuel conduit for producing said flow as a function of the pressure in a portion of said conduit, comprising: first and second by-pass conduits for the flow of fuel from the outlet of said pump to said source, a first valve for controlling said flow thru said first by-pass conduit to regulate a control pressure in a portion thereof, a second valve responsive to said control pressure for controlling said flow thru said second by-pass conduit to regulate said pressure in said portion of said fuel conduit, said first valve having a neutral position wherein said control pressure is substantially constant and being effective upon movement in opposite directions from said neutral position to produce opposite changes in the value of said control pressure, means responsive to an air pressure in said engine for positioning said first valve in said neutral position when the value of said pressure in said fuel conduit portion is in predetermined proportional relationship with the value of said air pressure, said positioning means being effective when said pressure relationship deviates from said predetermined proportionality to move said first valve from said neutral position to vary said control pressure and hence said pressure in said fuel conduit portion in a sense to restore said predetermined relationship, whereby said pressure in said fuel conduit portion is maintained in substantially constant predetermined proportional relationship with said air pressure.

7. Control apparatus as set forth in claim 6, including means for increasing said pressure in said fuel conduit portion to a value which is a substantially constant amount greater than the value corresponding to said predetermined proportional relationship.

8. Control apparatus as set forth in claim 6, including manually operated means for varying said predetermined relationship, whereby the fuel flow to said engine varies as a function of said air pressure and said manually operated means.

9. In a fuel supply system for an engine having a compressor associated therewith for delivering combustion air to said engine, control apparatus as set forth in claim 6, in which said air pressure is the absolute compressor discharge pressure in said engine, and said positioning means is also responsive to said pressure in said fuel conduit portion, and including manually operated means for varying the relative response of said positioning means to said compressor discharge pressure and said pressure in said fuel conduit portion for varying said predetermined proportional relationship.

10. In a fuel supply system for an engine having a compressor associated therewith for delivering combustion air to said engine, control apparatus as set forth in claim 6, in which said air pressure is the absolute compressor discharge pressure in said engine, said positioning means is also responsive to said pressure in said fuel conduit portion, and including manually operated means for varying the relative response of said positioning means to said pressure in said fuel conduit portion and said compressor discharge pressure for varying said predetermined relationship, and means for increasing said pressure in said fuel conduit portion to a value which is a substantially constant amount greater than the value corresponding to said predetermined proportional relationship.

11. Control apparatus as set forth in claim 6, including a first spring biasing said first valve in a sense to increase said pressure in said fuel conduit portion a substantially constant amount above the value corresponding to said predetermined proportional relationship, and a second spring biasing said second valve toward closed position for maintaining the differential between the pressure at the outlet of said pump and said control pressure at a substantially constant value.

12. Control apparatus as set forth in claim 6, including spring means for maintaining a substantially constant differential between the pressure at the outlet of said pump and said control pressure and for maintaining the value of said pressure in a said fuel conduit portion a substantially constant amount above the value corresponding to said predetermined proportional relationship, a manually operated control lever associated with said engine, and means responsive to said control lever for varying said predetermined proportional relationship between pre-established minimum and maximum values.

13. Fuel control apparatus for an internal combustion engine having associated therewith a source of fuel, a fuel conduit for the flow of fuel from said source to said engine, and a pump in said fuel conduit for producing said flow as a function of the pressure in a portion of said conduit, comprising: first and second substantially parallel levers having first and second fixed pivots respectively for angular movement of said levers on said pivots, first means for applying a first force measure of a condition in said engine to said first lever between said first and second pivots at a first predetermined distance from said first pivot, second means for applying a second force proportional to said pressure in said fuel conduit portion to said second lever at a second predetermined distance from said second pivot, a spacer between said levers at a point between said first pivot and the point of application of said first force to said first lever, said spacer being effective to transmit a third force proportional to said first force to said second lever in opposition to said second force so that said second lever is in equilibrium when the respective moments of said second and third forces are equal, a channel for the flow of fuel from the outlet from said pump to said source, and a relief valve in said channel responsive to said movement of said second lever for controlling said channel flow to regulate the pressure in said fuel conduit portion as a predetermined function of said first force whereby said pressure in said fuel conduit portion cannot fall below the value corresponding to said predetermined function.

14. Control apparatus as set forth in claim 13, in which said condition is an air pressure and said first force is proportional thereto, and including a passage for the flow of fuel from the outlet from said pump to said source, and a pilot valve operated by said second lever for regulating a control pressure in a portion of said passage, said pilot valve having a neutral position wherein said control pressure is substantially constant and being effective upon movement in opposite directions from said neutral position to produce opposite changes in the value of said control pressure, said neutral position of said pilot valve corresponding to said equilibrium position of said second lever, said relief valve being responsive to said control pressure and effective to regulate said outlet pressure at a value corresponding to a substantially constant differential between said outlet and said control pressure.

15. Control apparatus as set forth in claim 13, in which said condition is an absolute air pressure and said first force is proportional to said air pressure, and including a passage for the flow of fuel from the outlet from said pump to said source, a pilot valve operated by said second lever for regulating a control pressure in a portion of said passage, said pilot valve having a neutral position wherein said control pressure is substantially constant and being effective upon movement in opposite directions from said neutral position to produce opposite changes in the value of said control pressure, said neutral position of said pilot valve corresponding to said equilibrium position of said second lever, said relief valve being responsive to said control pressure and effective to regulate said outlet pressure at a value corresponding to a substantially constant differential between said outlet and said control pressures, and manually operated means for varying the position of said spacer relative to said pivots to modify said proportionality between said first and said third forces, whereby when said emergency pump supplies fuel to said engine said pressure in said fuel conduit portion is in substantially constant linear relationship with said obsolute air pressure, said relationship varying in response to said manually operated means.

16. Control apparatus as set forth in claim 13, including a first spring for imposing a fourth substantially constant force on said second lever in opposition to said second force, said second lever being in equilibrium when the sum of the moments of said third and fourth forces equals the moment of said second force thereby rendering said pressure in said fuel conduit portion a substantially constant amount greater than a value corresponding to a substantially constant proportional relationship between said air pressure and said pressure in said fuel conduit portion; said proportional relationship being determined by the relative positions of said pivots, said spring, said spacer, and the respective points of application of said forces; and means responsive to movement of said second lever for maintaining said pressure in said fuel conduit portion at the value corresponding to said condition of equilibrium.

17. Emergency fuel control apparatus for an internal combustion engine having associated therewith a compressor for supplying combustion air to said engine, a source of fuel, a main fuel pump connected to said source and main fuel control apparatus for the control of said main pump, and a first conduit for the flow of fuel from said main pump to said engine, comprising: an emergency fuel pump connected to said source and operated simultaneously with said main pump and a second conduit for the flow of fuel from said emergency pump to said first conduit and thence to said engine, check valve means in said first and second conduits downstream from said pumps for permitting flow to said engine thru said second conduit and preventing flow thru said first conduit only when the pressure in said first conduit downstream from said check valve means producible by said emergency pump exceeds said downstream pressure producible by said main pump.

18. Emergency fuel control apparatus for an internal combustion engine having associated therewith a compressor for supplying combustion air to said engine, a source of fuel, a main fuel pump connected to said source and main fuel control apparatus for the control of said main pump, a first conduit for the flow of fuel from said main pump to said engine, an emergency fuel pump connected to said source and operated simultaneously with said main pump and a second conduit for the flow of fuel from said emergency pump to said first conduit and thence to said engine, check valve means in said first and second conduits downstream from said pumps for permitting flow to said engine thru said second conduit and preventing flow thru said first conduit only when the pressure in said first conduit downstream from said check valve means producible by said emergency pump exceeds said downstream pressure producible by said main pump, comprising: relief valve means responsive to the absolute compressor discharge pressure in said engine and to the pressure in said first conduit downstream from said check valve means for controlling the pressure downstream from said emergency pump; said means being effecetive, when said main pump and/or said main fuel control apparatus fails so that said check valve means opens to permit flow to said first conduit from said emergency pump, to regulate the pressure in said first conduit downstream from said check valve means in substantially constant linear relationship with said absolute compressor discharge pressure.

19. Emergency fuel control apparatus for an internal combustion engine having associated therewith a compressor for supplying combustion air to said engine, a source of fuel, a main fuel pump connected to said source and main fuel control apparatus for the control of said main pump, a first conduit for the flow of fuel from said main pump to said engine, an emergency fuel pump connected to said source and operated simultaneously with said main pump and a second conduit for the flow of fuel from said emergency pump to said first conduit and thence to said engine, check valve means in said first and second conduits downstream from said pumps for permitting flow to said engine thru said second conduit and preventing flow thru said first conduit only when the pressure in said first conduit downstream from said check valve means producible by said emergency pump exceeds said downstream pressure producible by said main pump, comprising: first and second channels for the flow of fuel from the outlet of said emergency pump to said source, a first valve for controlling said flow in said first channel to regulate a control pressure in a portion thereof, said first valve having a neutral position wherein said control pressure is substantially constant and being effective upon movement in opposite directions from said neutral position to produce opposite changes in the value of said control pressure, means responsive to the absolute compressor discharge pressure in said engine and to the pressure downstream from said check valve means for positioning said first valve in said neutral position when the value of said downstream pressure is in predetermined linear relationship with the value of said air pressure, and a second valve responsive to said control pressure for controlling said flow thru said second channel and the discharge pressure at the outlet from said emergency fuel pump, said discharge pressure increasing as said control pressure increases, a spring biasing said second valve toward closed position for maintaining a substantially constant differential between said discharge pressure and said control pressure; said positioning means being effective, when said main pump is operating normally and hence when said check valve means prevents flow from said second conduit to said first conduit, to move said first valve in a sense to decrease said control pressure to a value at which said discharge pressure has a corresponding relatively low value which is greater than the pressure at the inlet to said emergency pump by an amount determined by said spring; said positioning means being also effective, when said downstream pressure decreases owing to failure of said main pump, to increase said discharge pressure so that the value of said downstream pressure does not fall below the value corresponding to said predetermined linear relationship.

20. Control apparatus for a fluid pump having associated therewith a conduit for the flow of fluid therefrom and a device responsive to said flow, said flow being a function of the pressure in a portion of said conduit, comprising: first means for obtaining a first measure of said pressure, second means for obtaining a second measure of an operating condition of said device, and third means responsive to said first and second means for maintaining said pressure in said conduit portion in substantially constant linear relationship with said second measure.

21. Control apparatus as set forth in claim 20, including manually operated means for varying said linear relationship.

22. Fuel control apparatus for an internal combustion engine having associated therewith a source of fuel, a fuel conduit for the flow of fuel from said source to said engine, and a pump in said fuel conduit for producing said flow as a function of the pressure in a portion of said fuel conduit, comprising: a by-pass conduit for the flow of fuel from the outlet of said pump to said source, a valve for controlling said flow thru said by-pass conduit to regulate a control pressure in a portion thereof, control means responsive to said control pressure for maintaining said pressure in said fuel conduit portion in pre-established relationship with said control pressure, said valve having a neutral position wherein said control pressure is substantially constant ang being effective upon movement in opposite directions therefrom to produce opposite changes in the value of said control pressure, means responsive to an air pressure in said engine for positioning said valve in said neutral position when the value of said pressure in said fuel conduit portion is in predetermined proportional relationship with the value of said air pressure, said positioning means being effective when said pressure relationship deviates from said predetermined proportionality to move said valve from said neutral position to vary said control pressure in a sense to restore said predetermined relationship, whereby said pressure in said fuel conduit portion is maintained in substantially constant predetermined proportional relationship with said air pressure.

23. For a turbojet engine having operatively associated therewith an incorporated air compressor, a source of liquid fuel, means for supplying said fuel from said source to said engine, the combination of main fuel control apparatus having means, responsive to the pressure differential across said compressor, effective to automatically control said fuel supply means so as to meet the requirements of said engine under varying engine operating conditions that affect said pressure differential, and emergency fuel control apparatus, operatively associated with said main control apparatus, and having means, responsive to the discharge pressure of said compressor and effective upon the failure of said main apparatus, to automatically take over and continue to control the supply of fuel from said source to said engine so as to meet said engine requirements.

24. The combination according to claim 23, wherein both main and emergency fuel control apparatuses are responsive to said manual control means operatively associated with said engine.

25. The combination according to claim 24, wherein both main and emergency fuel control apparatuses each have means effective to so control said fuel supply as to cause the engine speed to correspond to the position of said manual control means under varying engine operating conditions.

26. The combination according to claim 25, including a valve for varying or completely stopping the supply of fuel to said engine, said valve being operatively connected and responsive to said manual control means.

27. For a turbojet engine having operatively associated therewith an incorporated air compressor, and a source of fuel under superatmospheric pressure, the combination of a main fuel supply system, including control apparatus, responsive to the pressure differential across said compressor, for automatically controlling the delivery of fuel from said source to said engine so as to meet the requirements of said engine under varying engine operating conditions that affect said pressure differential, and an emergency fuel supply system operatively connected with said main system and having means, responsive to the discharge pressure of said compressor and effective, upon the failure of said main system, to automatically take over and continue to deliver fuel from said source to said engine so as to meet said engine requirements.

28. The combination according to claim 27, wherein said main and emergency fuel systems are connected in parallel to said source and to said engine.

29. The combination according to claim 27, wherein each fuel system includes means for preventing the flow of fuel from one thru the other.

30. The combination according to claim 27, wherein each fuel system includes fuel flow control means adapted to respond to a common manual control means operatively associated with said engine.

31. The combination according to claim 30, wherein each fuel system includes means adapted to so control the fuel flow therethru as to cause the engine speed to correspond to the position of said manual control means under varying engine operating conditions.

32. The combination according to claim 30, including a valve, operatively connected and responsive to said manual control means, for varying or completely stopping the delivery of fuel to said engine.

33. For an internal combustion engine having an air supply and a fuel supply thereto, including main fuel control apparatus adapted to automatically control said fuel supply so as to meet the requirements of said engine under normal operating conditions; an emergency fuel control apparatus operatively associated with said air supply and said main apparatus, and adapted upon failure of, said main apparatus, to automatically take over and continue to control said fuel supply so as to meet the requirements of the engine under varying operating conditions.

34. An emergency fuel control apparatus according to claim 33, including means to maintain a predetermined linear relationship between the rate of fuel supply and the rate of air supply to said engine.

35. An emergency fuel control apparatus according to claim 33, including means for obtaining a measure of the rate of said air supply and means for maintaining the fuel supply under a pressure which bears a predetermined linear relationship to said measure.

36. An emergency fuel control apparatus according to claim 35, including manually operated means for varying said linear relationship.

37. An emergency fuel control apparatus according to claim 35, including means for compensating said fuel pressure for changes in atmospheric density.

38. An emergency fuel control apparatus according to claim 35, which includes an hydraulically operated valve for regulating the said fuel pressure.

39. An emergency fuel control apparatus according to claim 38, which includes means for employing a part of said fuel supply as an hydraulic fluid for operating said valve and means for controlling the supply of said fluid to said valve.

References Cited in the file of this patent

UNITED STATES PATENTS

| 1,510,688 | La Fon | Oct. 7, 1924 |
| 1,970,380 | Hösel | Aug. 14, 1934 |
| 2,095,991 | Lysholm | Oct. 19, 1937 |
| 2,136,959 | Winfield | Nov. 15, 1938 |
| 2,330,558 | Curtis | Sept. 28, 1943 |
| 2,356,786 | Harman et al. | Aug. 29, 1944 |
| 2,371,889 | Hermitte | Mar. 20, 1945 |
| 2,378,037 | Reggio | June 12, 1945 |
| 2,405,888 | Holley | Aug. 13, 1946 |
| 2,411,312 | Yonkers | Nov. 19, 1946 |
| 2,422,808 | Stokes | June 24, 1947 |
| 2,440,371 | Holley | Apr. 27, 1948 |
| 2,441,948 | Atkinson | May 25, 1948 |
| 2,457,595 | Orr | Dec. 28, 1948 |
| 2,469,678 | Wyman | May 10, 1949 |
| 2,570,591 | Price | Oct. 9, 1951 |

FOREIGN PATENTS

| 606,613 | France | Mar. 12, 1926 |
| 918,123 | France | Oct. 7, 1946 |
| 490,978 | Great Britain | Aug. 24, 1938 |

OTHER REFERENCES

Power, January 1944, pages 84 to 86.